3,405,250
TUBE WIRE ELECTRODE

Robert H. Lee, Lakeridge, Matawan, N.J., assignor to Union Carbide Corporation, a corporation of New York
No Drawing. Continuation of abandoned application Ser. No. 305,210, Aug. 28, 1963. This application Jan. 19, 1966, Ser. No. 521,498
8 Claims. (Cl. 219—146)

This application is a continuation of application Ser. No. 305,210 filed Aug. 28, 1963 now abandoned.

This invention relates to arc welding and, more particularly, to carbon dioxide, consumable electrode arc welding processes and electrodes for use therein.

The arc welding process, the improvement in which constitutes my invention, is characterized by a composite electrode consisting of a continuous tubular bare surface metal sheath containing a core of flux material surrounded by a carbon dioxide shielding gas.

This process is generally used to weld carbon steels. However, the tube wires presently available for use in the process have serious shortcomings when heavily mill scaled and/or heavily rusted steel plate is to be welded. First, most wires produce a relatively high strength weld deposit with relatively low ductility. Second, most wires produce welds with poor impact strength. Third, the weld metal and slag are of such fluidity and consistency that they cannot counteract the effect of gravity so that the positions of welding are rather limited.

The tube wire of the present invention produces sound weld deposits over mill scale and rust without impairing weld metal ductility or impact strength and without an excessive rise in ultimate strength.

It is an object of this invention to provide a tube wire which is low-cost and capable of high quality performance.

It is another object to provide a tube wire which will produce sound welds in dirty, rusty surfaces.

Another object is to provide a tube wire that will produce welds having excellent shape with a smooth surface.

Yet another object is to provide a tube wire which produces an easily removable slag.

Still another object is to provide a tube wire which will produce stable arc behavior and minimum spatter.

All the above objects and others are accomplished by the present tube wire which contains the optimum percent by weight flux core material relative to the total weight of the electrode. The flux core material is comprised of slag formers, deoxidizers, killing agents, and arc stabilizers, all combined in a critical relationship with each other and with the sheathing metal tube so that they will react in the welding arc and weld puddle to yield weld metal essentially free of nonmetallic oxide inclusion.

It is well known, in the welding composition art, that the ingredients and the relative amounts thereof in a particular flux system are critical. Only one ingredient, or even the amount of that ingredient, need be changed to produce another flux system having completely different characteristics which may not be suitable for solving a particular problem.

The tube wire which will be described herein for use with carbon dioxide shielding gas is a composite electrode comprising a hollow metallic sheath containing flux core material consisting essentially of the following nonhygroscopic mechanically mixed ingredients:

| Ingredients: | Weight percent |
|---|---|
| MgO | 6.5–15 |
| $TiO_2$ | 35–50 |
| $Na_3AlF_6$ | 2–6 |
| $Fe_3O_4$ | 0–15 |
| FeMnSi | 10–20 |
| Fe | 15–30 |
| Zircon sand | 5–10 |
| Na or K Silicate | 1.5 |

The flux material should be from 18–24 weight percent of the total electrode.

Electrodes that utilize a flux inside a tube are unique among those welding processes that employ a slag to provide protection for the weld puddle. The effect of submerged arc welding is a slag blanket formed by simple fusion of a flux material that is piled on top of a joint. The effect of a metal electrode externally coated with a granular flux is somewhat the same since the flux fused about the droplets of metal and is deposited over and around the weld puddle. However, an electrode with an internally contained flux will form metal droplets with a kernel of liquified flux. These same duplex droplets will traverse the welding arc and may be propelled into the weld puddle. In effect, the slag is driven to the bottom of the weld puddle by the arc force generated by "pinch" and plasma jets of the shielding gas. A most serious consequence of this physical act has been the dispersion of the liquified flux (which also contains small unfused nonmetallic particles) into many micro-volumes which are easily entrained in the solidifying weld puddle.

The present tube wire takes advantage of this physical act which permits intimate mingling of molten slag and metal by creating macrovolumes of dispersed slag (not microvolumes) from chemical reactions between deoxidizers and killing agents and a generous source of oxygen provided either by the flux itself in the form of iron oxide ($Fe_3O_4$) or from any other source of oxygen in the vicinity of the weld.

It has been shown that silicomanganese alloys compared to the separate use of ferromanganese and ferrosilicon additions to steel melts creates liquid silicate particles of a larger size. The present electrode creates large liquid droplets of slag in the weld pool by the reaction:

$$4MnSi + 3Fe_3O_4 \rightarrow 9Fe + 4MnSiO_3$$

The use of the double alloy suppresses the more usual reaction encountered with ferromanganese and ferrosilicon:

$$FeSi + O_2 \rightarrow Fe + SiO_2$$
$$FeMn + O_2 \rightarrow Fe + MnO_2$$

The double alloy is added in sufficient quantity so that not all of it will be consumed by the iron oxide reaction, but enough will be left to combine with dissolved oxygen in the weld pool to form liquid manganese silicate volumes which will be devoured by the larger volumes of manganese silicate heretofore described by the iron oxide reaction.

The macrovolumes of manganese silicate are readily removed from the puddle in conformance to Stokes' Law:

$$V = 2gr^2(d_1 - d_2)/9n$$

Where V equals the rate of rise of a suspended particle in a liquid; $g$ the acceleration due to gravity; $r$ the radius of the liquid particle; $d_1$ the density of the steel; $d_2$ the density of the liquid particle; $n$ the viscosity of the steel. The wire of the invention increases $r$ and decreases $d_2$, increasing the rate of rise of the suspended phase.

Hence, it is seen that nonmetallic phases are quickly united into a liquid phase and removed.

A second advantage achieved by the tube wire of the invention is that a slag is created that will wet steel adjacent to the weld. By doing so, the slag may serve to bolster up weld metal against the force of gravity. This has been accomplished in the present invention by recognizing the ability of an acid behaving slag to absorb oxygen ions.

An economically suited slag former that has a fairly high affinity for oxygen, is acid in character, and will not adversely affect puddle behavior and weld appearance is $TiO_2$ (titanium dioxide). There are others which will attract oxygen to a high degree such as silica ($SiO_2$) and phosphorus oxide ($P_2O_5$), but these must be omitted for one or more reasons—excess $SiO_2$ makes the slag difficult to remove and deposit along the edges of a weld; $P_2O_5$ is harmful to weld metal mechanical properties. Still others can be rejected because of limited availability, toxicity, and adverse effect on slag viscosity.

A preferred embodiment of the present invention includes a 5/32 in. diameter O.D. tubular mild steel sheath containing 20 percent weight of a nonhygroscopic, mechanically mixed flux core material consisting essentially of:

| Ingredient: | Weight percent |
| --- | --- |
| $TiO_2$ 40 x D | 40 |
| MgO 100 x D | 12 |
| Cryolite 100 x D | 4.5 |
| FeMnSi 100 x D | 16.5 |
| Iron powder 100 x 325 | 18 |
| Zircon sand 100 x D | 7.5 |
| Anhydrous sodium silicate powder | 1.5 |

All the above ingredients were simply dry mixed for 15 minutes in a blender and then inserted in the sheath. However, the flux may be bonded with wet sodium or potassium silicate if desired for packing the flux into the sheath.

The above-described preferred tube wire electrode was used in the following described tests and has met the following standard:

MECHANICAL PROPERTIES

| | Undiluted weld metal | | | |
| --- | --- | --- | --- | --- |
| | Yield strength, p.s.i. | Ultimate strength, p.s.i. | Elongation, percent in 2 in. | Reduction of area, percent |
| X-ray clear | 81,250 | 91,000 | 24 | [1] 62.3 |
| | 79,250 | 88,200 | 27.4 | [1] 67.3 |

[1] A.W. 0.505 dia.

| Impact values, Charpy "V" | Feet | pounds |
| --- | --- | --- |
| Room temperature | 90 | 87 |
| 0 degrees Fahrenheit | 43 | 41 |
| −20 degrees Fahrenheit | 37 | 36 |

Welding performance:

(1) Horizontal fillet—rust and mill scale surface; welds were radiographically sound; bead shape was flat and smooth.
(2) Butt joint—prepared in rusted surface; welds were radiographically sound and free of inclusions.
(3) Slag cover—complete in 1 and 2; slag removal easy.
(4) Arc action—smooth with little spatter.

The tube wire of this invention is the only wire which combines good impact strength, high tensile and yield strength, with good ductility.

In summary, some of the advantages and outstanding characteristics of the tube wire are a dry mix core material; ability to weld over rust, mill scale and oily surfaces; wide range of amperage and voltage over which it is capable of operating; good slag removal; unique in out of position welding.

While I have described the invention with reference to a preferred embodiment, it is to be understood that certain modifications may be made to the wire within the above-defined limits.

What is claimed is:

1. A consumable composite electrode for use in a carbon dioxide gas shielded electric arc welding process consisting of a mild steel sheath containing a flux core material consisting of the following ingredients:

| Ingredients: | Weight percent |
| --- | --- |
| MgO | 6.5–15 |
| $TiO_2$ | 35–50 |
| $Na_3AlF_6$ | 2–6 |
| $Fe_3O_4$ | 0–15 |
| FeMnSi | 10–20 |
| Fe | 15–30 |
| Zircon sand | 5–10 |
| Na or K silicate | 0–5 | in which the flux core material is about 18 to about 24 weight percent of the total electrode.

2. A consumable composite electrode for use in a carbon dioxide gas shielded electric arc welding process consisting of a mild steel sheath containing a flux core material consisting of the following ingredients:

| Ingredients: | Weight percent |
| --- | --- |
| MgO | 6.5–15 |
| $TiO_2$ | 35–50 |
| $Na_3AlF_6$ | 2–6 |
| $Fe_3O_4$ | 0–15 |
| FeMnSi | 10–20 |
| Fe | 15–30 |
| Zircon sand | 5–10 |
| Na or K silicate | 0–5 | in which the flux core material is bonded with a silicate from the class consisting of sodium and potassium silicates and such core is about 18 to about 24 weight percent of the total electrode.

3. A consumable composite electrode for use in a carbon dioxide gas shielded electric arc welding process consisting of a mild steel sheath containing a flux core material consisting of the following nonhygroscopic mechanically mixed ingredients:

| Ingredients: | Weight percent |
| --- | --- |
| MgO | 6.5–15 |
| $TiO_2$ | 35–50 |
| $Na_3AlF_6$ | 2–6 |
| $Fe_3O_4$ | 0–15 |
| FeMnSi | 10–20 |
| Fe | 15–30 |
| Zircon sand | 5–10 |
| Na or K silicate | 0–5 | in which the flux core material is about 18 to about 24 weight percent of the total electrode.

4. A consumable composite electrode according to claim 3 in which the flux core material is about 20 weight percent of the total electrode.

5. A consumable composite electrode for use in a carbon dioxide gas shielded electric arc welding process consisting of a mild steel sheath containing a flux core material consisting of the following nonhygroscopic mechanically mixed ingredients:

| Ingredients: | Weight percent |
| --- | --- |
| MgO | 12 |
| $TiO_2$ | 40 |
| $Na_3AlF_6$ | 4.5 |
| FeMnSi | 16.5 |
| Fe | 18 |
| Zircon sand | 7.5 |
| Anhydrous sodium silicate | 1.5 | in which the flux core material is about 18 to about 24 weight percent of the total electrode.

6. A consumable composite electrode according to claim 5 in which the flux core material is about 20 weight percent of the total electrode.

7. A process for welding rusty, scaly, dirty steel surfaces which comprises establishing a welding arc between said surfaces and consumable composite electrode consisting of a mild steel sheath containing a core material consisting of the following nonhygroscopic mechanically mixed ingredients:

| Ingredients: | Weight percent |
|---|---|
| MgO | 6.5–15 |
| $TiO_2$ | 35–50 |
| $Na_3AlF_6$ | 2–6 |
| $Fe_3O_4$ | 0–15 |
| FeMnSi | 10–20 |
| Fe | 15–30 |
| Zircon sand | 5–10 |
| Na or K silicate | 0–5 | in which the flux core material is about 18 to about 24 weight percent of the total electrode; supplying a stream of carbon dioxide gas around said arc; continuously providing relative movement between said electrode and said surfaces and depositing metal from said electrode into the joint to be welded; and shielding the molten weld metal with easily removable slag cover formed from the ingredient carried by said electrode.

8. A process according to claim 7 wherein the consumable composite electrode consists of a mild steel sheath containing a core material consisting of the following nonhygroscopic mechanically mixed ingredients:

| Ingredients: | Weight percent |
|---|---|
| MgO | 12 |
| $TiO_2$ | 40 |
| $Na_3AlF_6$ | 4.5 |
| FeMnSi | 16.5 |
| Fe | 18 |
| Zircon sand | 7.5 |
| Anhydrous sodium silicate | 1.5 |

References Cited

UNITED STATES PATENTS 2,164,775   7/1939   Miller _____ 219—146 X
2,737,150   3/1956   Gayley _____ 219—146 X RICHARD M. WOOD, *Primary Examiner.*

B. A. STEIN, *Assistant Examiner.*